United States Patent [19]

Cavileer

[11] 4,277,046
[45] Jul. 7, 1981

[54] IRRIGATION VALVE

[76] Inventor: Watson V. Cavileer, 2861 Amherst Dr., Fullerton, Calif. 92631

[21] Appl. No.: 159,124

[22] Filed: Jun. 13, 1980

Related U.S. Application Data

[63] Continuation-in-part of Ser. No. 945,337, Sep. 25, 1978, abandoned.

[51] Int. Cl.³ .............................................. F16K 5/02
[52] U.S. Cl. .............................. 251/312; 251/DIG. 5
[58] Field of Search ......... 251/309, 312, 366, DIG. 5; 137/625.41, 625.47; 285/DIG. 22

[56] References Cited

U.S. PATENT DOCUMENTS

| | | | |
|---|---|---|---|
| 1,336,211 | 4/1920 | Duffy | 251/309 |
| 2,832,562 | 4/1958 | Myers | 251/312 |
| 3,048,192 | 8/1962 | Murphy, Jr. | 251/312 |
| 3,276,472 | 10/1966 | Jinkens et al. | 137/625.41 |
| 3,481,367 | 12/1969 | Deuschle | 251/309 |
| 3,640,552 | 2/1972 | Demler, Sr. et al. | 285/110 |
| 3,678,960 | 7/1972 | Leibinsohn | 137/625.47 |
| 3,704,704 | 12/1972 | Gonzales | 251/309 |
| 3,750,704 | 8/1973 | Burke et al. | 137/625.47 |
| 3,783,900 | 1/1974 | Waldbillig | 137/625.47 |
| 3,788,599 | 1/1974 | Cloyd | 251/309 |
| 3,788,602 | 1/1974 | Kitzie | 251/312 |
| 3,790,132 | 2/1974 | Schmitt | 251/312 |
| 3,889,712 | 6/1975 | Fields | 137/625.47 |
| 4,003,403 | 1/1977 | Nehring | 137/625.41 |
| 4,197,876 | 4/1980 | Lobdell | 137/625.47 |
| 4,207,923 | 6/1980 | Giurtino | 137/625.47 |

*Primary Examiner*—William R. Cline
*Assistant Examiner*—H. Jay Spiegel
*Attorney, Agent, or Firm*—Gausewitz, Carr, Rothenberg & Edwards

[57] ABSTRACT

This invention provides a valve consisting of a body and rotatable valve member, both of which are made of plastic, the valve body having a passageway intersected by a frustoconical opening which receives the valve member. The valve member is rotatable for controlling the flow through the passageway, the rotation being accomplished by engaging a recess in the outer end of the valve member. The body includes an outwardly deflectable shoulder that fits over the outer end of the valve member to hold the valve member in the body. The valve member is made to a greater major diameter than that of the opening in the valve body to provide an interference fit. Deep annular grooves around the valve opening provide a thin wall for the valve body around the opening, allowing distortion-free molding of the valve body.

11 Claims, 7 Drawing Figures

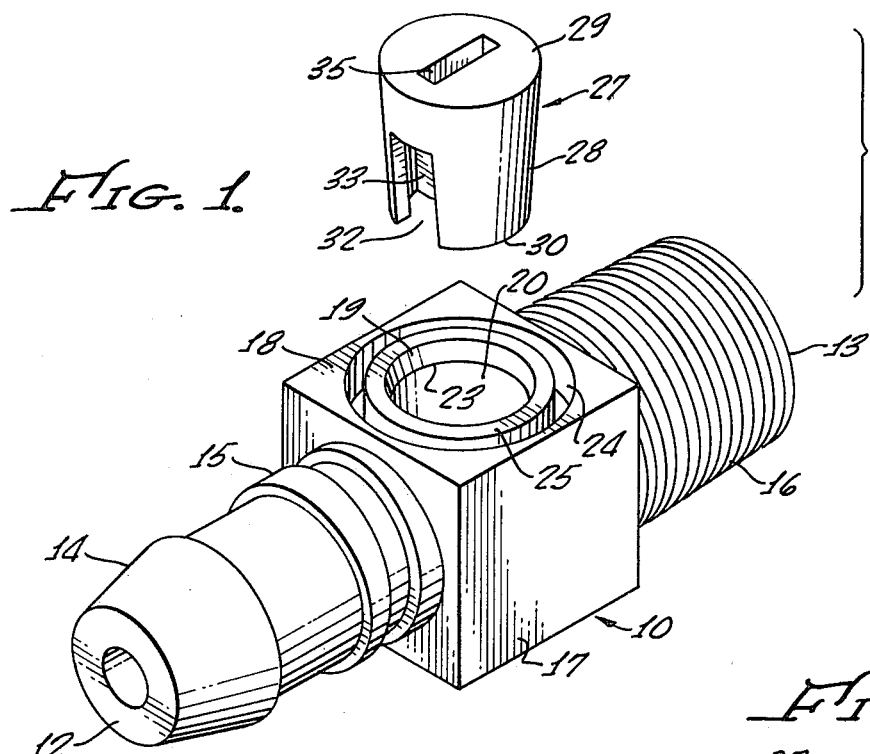
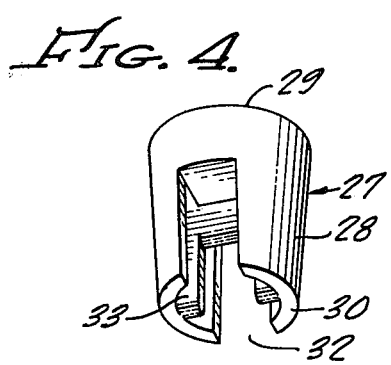
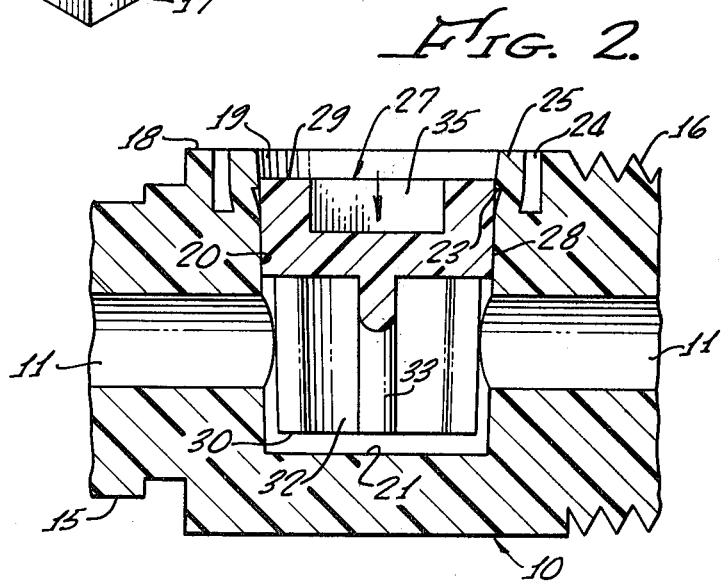
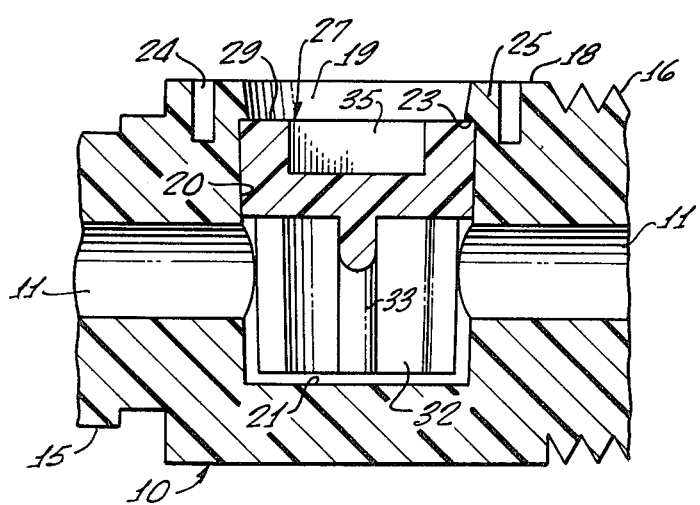

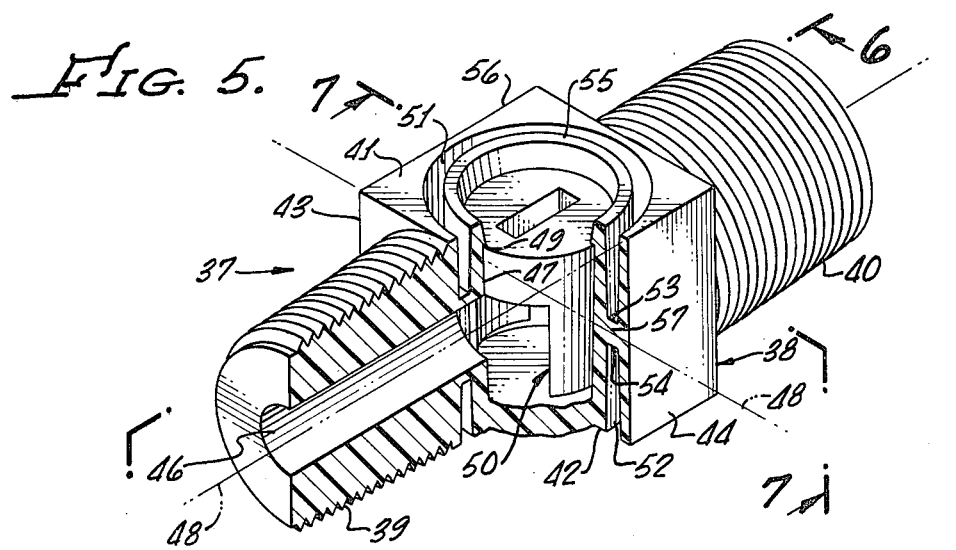
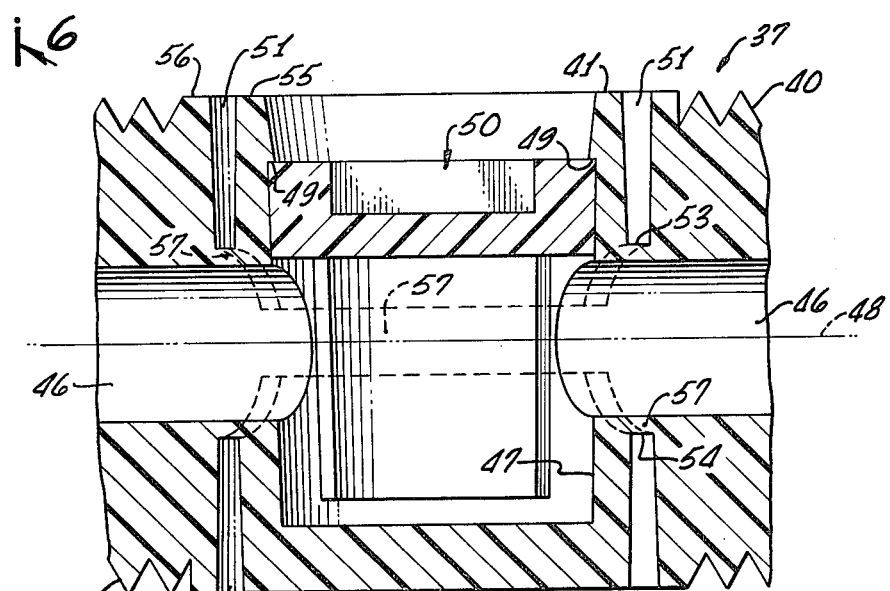
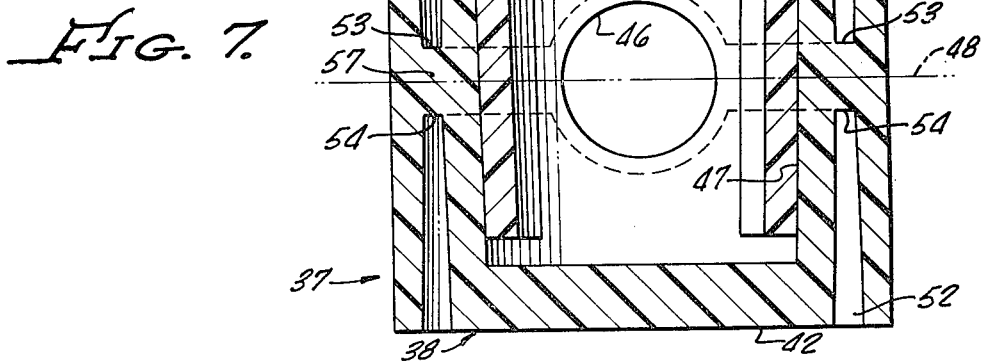

IRRIGATION VALVE

CROSS-REFERENCE TO RELATED APPLICATION

This is a continuation-in-part of my copending patent application Ser. No. 945,337 filed Sept. 25, 1978 for IRRIGATION VALVE, now abandoned.

BACKGROUND OF THE INVENTION

1. Field of the Invention

This invention pertains to valves.

2. Description of the Prior Art

In drip irrigation systems, such as used in orchards and other locations, many lines are connected to a water main and are intended to provide a metered flow of water to various trees or other plant life to accomplish slow irrigation. It is important to control the flow in the various fluid lines in order that each specimen will receive the right amount of water, not too much and not too little. This requires a large number of valves for controlling the flow. Because of the number of valves used, they should be low in cost to keep the price of an irrigation system within reason. The valves should be easy to handle, noncorrosive, durable, reliable, and readily adjustable. Valves of the prior art do not, in any one design, meet all of these criteria. Frequently, valves of brass have been used which are relatively costly and somewhat complex in construction.

Plastic valves have been made for other purposes, but have not been adapted as low cost valves for drip irrigation systems. In particular, when plastic valves are of molded construction, distortion results from shrinkage of the material as it cools during the molding process. This may cause the surface of the valve body engaged by the valve member to be out of round so that the valve member will not seal against it. This is an especially troublesome problem where fluid pressures are relatively high. If the valve body is machined to provide an accurately contoured surface, the cost of the valve is increased greatly.

SUMMARY OF THE INVENTION

The present invention provides a very simple, two-piece, plastic valve which can be of molded construction and assembled merely by pressing one part into the other. This valve possesses the desirable properties noted above, also being lightweight and readily adapted for connections to various kinds of fluid lines.

The valve of this invention includes a body of plastic material with a passageway extending from one end to the other. These ends of the valve body are adapted for connection to other fluid lines or fittings. In the central portion of the body is a frustoconical opening larger than the passageway and intersecting it. This opening is adapted to receive a frustoconical valve member with an identical taper. The valve member is made to a slightly larger diameter at its outer end so that it is received in the valve body with an interference fit.

The valve member is retained in the body by means of an annular shoulder which is deflectable outwardly as the valve member is forced into the frustoconical opening. When the valve member is fully received in the opening, the shoulder snaps inwardly over the outer surface of the valve member to permanently retain it. The shoulder is made outwardly deflectable by providing an annular groove outwardly of the shoulder so that the body has a relatively thin wall at this location which can be bent outwardly as the valve member is forced into the body.

The central portion of the valve body is provided with flat parallel top and bottom walls, and similar side walls, so that it has a square shape. This enables the valve body to be engaged and held by a wrench when the valve is being connected to other components of the hydraulic system.

A deep annular groove extends inwardly from each of the top and bottom walls around the frustoconical opening. These grooves are separated by only a narrow strip of material at the central part of the valve body. As a result, the valve body has a thin wall around the frustoconical opening. This enables the valve body to be molded without distorting the wall of the opening. The reduced mass of material around the opening, provided by the deep grooves, will not change its contour appreciably as it cools during the molding operation. Therefore, the valve body can be molded without requiring an extra machining step so that the cost of the valve body is reduced significantly. At the same time, the valve easily withstands the pressure encountered in drip irrigation systems without leakage.

BRIEF DESCRIPTION OF THE DRAWINGS

FIG. 1 is an exploded perspective view of the valve of this invention;

FIG. 2 is an enlarged fragmentary longitudinal sectional view of the central portion of the valve as the valve member is being inserted into the valve body;

FIG. 3 is a view similar to FIG. 2 with the assembly complete;

FIG. 4 is a bottom perspective view of the valve member;

FIG. 5 is a perspective view, partially broken away, of a modified form of the valve which requires no machining after molding;

FIG. 6 is an enlarged fragmentary longitudinal sectional view, taken along line 6—6 of FIG. 5, and FIG. 7 is an enlarged transverse sectional view, taken along line 7—7 of FIG. 5.

DESCRIPTION OF THE PREFERRED EMBODIMENT

The valve of this invention includes a body 10, preferably of plastic such as polypropylene which has some resilience, with a passageway 11 extending from one end 12 to the opposite end 13. The body is adapted to be connected to other fluid lines at its ends 12 and 13. In the example illustrated, the end 12 has a frustoconical exterior surface 14 inwardly of which are threads 15 enabling this part of the valve to be connected to a tube. The opposite end has pipe threads 16 on the exterior so that it can be connected to standard plumbing fittings.

The central portion 17 of the valve body 10 has a cubical exterior contour. An opening extends inwardly from the upper wall 18 of the central portion 17 including a short entrance portion 19 that connects to a longer inner part 20. The latter portion of the opening intersects the passageway 11 through the valve and forms a central chamber of larger diameter than that of the passageway 11. The portion 20 of the opening in the valve body is frustoconical, with a shallow taper such as a 6° included angle by which the sidewall converges inwardly. At the inner end of the opening 20 is a flat surface 21 that forms the bottom of the central chamber of the valve.

At the upper end of the opening 20 is an annular shoulder 23 that extends radially inwardly and interconnects the inner end of the entrance portion 19 of the opening with the outer end of the portion 20. The entrance 19 tapers from the upper surface 18 of the valve body 10 to the shoulder 23.

An annular groove 24 extends inwardly from the upper surface 18 of the valve body 10, circumscribing the outer portion of the opening in the valve body. This groove 24 is of a depth such that it extends below the level of the annular shoulder 23. This provides the valve body 10 with a relatively thin annular wall 25 outwardly of the shoulder 23. The relatively thin walled portion 25 is recessed in this way and is protected by the remaining portion of the valve body outwardly of it.

Flow through the valve 10 is controlled by a valve member 27 which fits within the inner portion 20 of the opening in the valve body in the completed assembly. The member 27 also is made of plastic material, such as that marketed under the trademark "Delrin." The valve member 27 is of a frustoconical contour, having a sidewall 28 that tapers from a relatively wide flat upper end 29 to a narrower lower end 30. The taper of the sidewall 28 of the valve member 27 is the same as the taper of the inner portion 20 of the opening in the valve body, being 6° in the example illustrated. However, the valve member 27 is of slightly larger diameter than the free diameter of the opening 20. That is to say, the diameter of the valve member 27 at its upper end 29, which is in a radial plane, is larger than the diameter of the opening 20 immediately below the shoulder 23. This may be a differential of 0.002 inch to 0.003 inch. The length of the valve member 27, however, is slightly less than the length of the opening 20 between the shoulder 23 and the inner end wall 21.

The lower portion of the valve member 27 is bifurcated through the provision of an enlarged radial slot 32 which forms a radial passageway through the lower end of the valve member 27. At the center of the slot 32 is a web 33 which strengthens the valve member 27. In the upper end 29 of the valve member 27 is a recess 35 aligned with the slot 32. The recess 35 is dimensioned to receive a screwdriver blade.

The valve is assembled and made ready for use merely be positioning the valve member 27 within the opening 20 of the valve body. This is accomplished by forcing the valve member into the opening 20 through the entrance portion 19 of the opening, deflecting the wall 25 of the valve body as this takes place so that the valve member may move past the shoulder 23. Because of the annular groove 24, resulting in the relatively thin wall 25 of the valve body adjacent the shoulder 23, and the resilient nature of the material of the valve body, it is possible to force the valve member 27 into the valve body 10 in this way. The narrower bottom end 30 of the valve member fits into the entrance 19 of the valve body opening so that the tapered sidewall 28 can act as a wedge to deflect the shoulder 23 outwardly as the valve member is advanced axially. As soon as the valve member 27 has been advanced to the point where its upper surface 29 moves past the shoulder 23 the latter element snaps inwardly to overlap the upper end 29 of the valve member, permanently retaining the valve member within the valve body. Thus, one simple operation assembles the two components of the valve, without the use of fasteners or other extra parts to hold the two components together.

Because the valve member 27 has a maximum diameter at its upper surface 29 that is larger than that of the opening 20 at the shoulder 23, there is an interference fit between the valve member and the valve body. This effectively seals the valve member and the valve body so that there is no leakage around the outer surface 28 of the valve member. No auxiliary sealing elements are necessary. The interference fit also results in a desirable amount of friction between the periphery of the valve member and the wall of the opening in the valve body, so that the valve member will retain whatever rotational position it is given within the valve body.

The valve is adjusted easily by means of a screwdriver received in the recess 35 for rotating the valve member 27. Full flow can be achieved by aligning the slot 32 of the valve member with passageway 11 through the valve body. Ninety degree rotation causes the wall 28 of the valve member 27 to block the passageway 11 and cut off all flow through the valve body. Metered flow is accomplished by rotational positions intermediate the two extremes. The recess 35, being aligned with the passageway through the valve member defined by the slot 32, gives an external indication of the rotational position of the valve member.

The embodiments of FIGS. 5, 6 and 7 includes a valve body 37 with a cubical central section 38 from which elongated end sections 39 and 40 extend for connection to other components in a fluid system. The flat parallel top and bottom walls 41 and 42, and similar opposite side walls 43 and 44 which interconnect them, facilitate making the connections by enabling the central section 38 of the valve body to be engaged and held against rotation by a wrench.

An elongated passageway 46, circular in cross-section, extends through the end portions 39 and 40 and the central section 38, intersecting a frustoconical opening 47 in the latter portion. The medial plane 48 of the body 37 extends through the passageway 46 at its axis. Within the opening 47, retained by a shoulder 49, is a valve member 50 which is similar to the valve member 27 of the previously described embodiment. Also, as in the other embodiment, the valve opening extends to the top wall of the valve body, but is closed at the bottom wall.

Extending inwardly from the top and bottom surfaces 41 and 42, respectively, of the central body 38 are deep narrow annular grooves 51 and 52. These grooves are circular in end elevation and coaxial with the opening 47. The grooves 51 and 52 are closely spaced from the wall of the frustoconical opening 47. The inner ends 53 and 54 of the grooves are close to each other, and, at locations other than that of the passageway 46, are parallel to the medial plane 48 and spaced apart a distance less than the lateral dimension of the passageway. The grooves extend around the passageway 46 with their inner ends at that location being circular segments closely spaced from and parallel to the wall of the passageway.

As a result of this construction, the valve body includes a thin-walled central inner portion 55 separated from the central outer portion 56 by the grooves 51 and 52. A narrow annular segment 57 interconnects the inner and outer portions 55 and 65.

This arrangement enables the valve body 37 to be molded with no subsequent machining, in particular of the surface of the frustoconical opening 47. This is because the thin-walled inner valve body portion 55 will not become distorted as it cools during the molding operation. The amount of material around the opening 47 is greatly reduced by the grooves 51 and 52, which allows the accurate molding to take place. Where there is a thick wall around the valve opening, such as in the embodiment of FIGS. 1 through 4, distortion will occur as the plastic material of the valve solidifies.

Accordingly, a great advantage in the economical production of the valve is achieved through the arrangement of FIGS. 5 through 7. The provision of the deep grooves extending inwardly from both the top and bottom walls 41 and 42 locates the interconnecting portion 57 at the medial plane 48 of the valve body. This provides a stable connection between the inner and outer body portions even though the interconnecting part 57 is narrow. This also locates the interconnecting part well within the valve body where it is fully protected.

The deep groove 51 in the top wall 51 also facilitates the outward deflection of the shoulder 49 as the valve member 50 is installed in the valve.

The foregoing detailed description is to be clearly understood as given by way of illustration and example only, the spirit and scope of this invention being limited solely by the appended claims.

I claim:

1. A valve comprising
   a body of resilient plastic material having opposite top and bottom walls,
   a relatively deep narrow uninterrupted annular groove extending inwardly from each of said walls,
   said grooves extending toward each other and having inner ends closely spaced apart at a location intermediate said top and bottom walls, so that said body has an outer portion on the outside of said grooves, an inner portion on the inside of said grooves, and a connecting portion between said ends of said grooves connecting said inner portion and said outer portion,
   said inner portion having an opening therein having a frustoconical surface closely spaced from said grooves so that said inner portion has a continuous relatively thin wall,
   and a passageway extending through said outer portion, said connecting portion and said inner portion and intersecting said opening in said inner portion,
   and a valve member in said opening,
   said valve member having a frustoconical exterior surface complementarily engaging said frustoconical wall of said opening in said inner portion,
   said valve member having a passageway therethrough and being rotatable relative to said body for selectively interconnecting said passageway in said valve member with said passageway in said body for controlling the flow of fluid through said body,
   said inner portion having a shoulder overlapping the outer end surface of said valve member for retaining said valve member in said opening,
   said valve member having a greater external diameter adjacent the outer end surface thereof than the free diameter of said opening adjacent said shoulder,
   whereby said valve member has an interference fit within said opening for providing a seal between said valve member and said body.

2. A device as recited in claim 1 in which said grooves are circular in end elevation and coaxial with said opening in said inner portion.

3. A device as recited in claim 1 in which said top and said bottom walls are substantially flat and parallel.

4. A device as recited in claim 3 in which said outer portion of said body includes two opposite side walls, said opposite side walls being substantially flat and parallel.

5. A device as recited in claim 4 in which said side walls interconnect said top and bottom walls.

6. A device as recited in claim 5 in which said outer end surface of said valve member is recessed below said top wall, and is provided with a recess for accepting a driving tool for use in rotating said valve member.

7. A device as recited in claim 1 in which said passageway has a longitudinal axis falling substantially in the medial plane of said body.

8. A valve comprising:
   a body of resilient plastic material having opposite top and bottom walls,
   a relatively deep narrow groove extending inwardly from each of said walls,
   said grooves extending toward each other and having inner ends closely spaced apart at a location intermediate said top and bottom walls, so that said body has an outer portion on the outside of said grooves, an inner portion on the inside of said grooves, and a connecting portion between said ends of said grooves connecting said inner portion and said outer portion,
   said inner portion having an opening therein having a frustoconical surface closely spaced from said grooves so that said inner portion is thin-walled,
   and a passageway extending through said outer portion, said connecting portion and said inner portion and intersecting said opening in said inner portion, said inner ends of said grooves being closer together than the transverse dimension of said passageway at locations remote from said passageway, and farther apart than the transverse dimension of said passageway at locations adjacent said passageway,
   and a valve member in said opening,
   said valve member having a frustoconical exterior surface complementarily engaging said frustoconical wall of said opening in said inner portion,
   said valve member having a passageway therethrough and being rotatable relative to said body for selectively interconnecting said passageway in said valve member with said passageway in said body for controlling the flow of fluid through said body,
   said inner portion having a shoulder overlapping the outer end surface of said valve member for retaining said valve member in said opening,
   said valve member having a greater external diameter adjacent the outer end surface thereof than the free diameter of said opening adjacent said shoulder,
   whereby said valve member has an interference fit within said opening for providing a seal between said valve member and said body.

9. A device as recited in claim 8 in which a medial plane through said body extends through said passageway, said inner ends of said grooves being on opposite sides of said medial plane.

10. A device as recited in claim 9 in which said inner ends of said grooves are substantially parallel to said medial plane at locations remote from said passageway, and are substantially parallel to the wall of said passageway at locations adjacent said passageway.

11. A device as recited in claim 10 in which said passageway is substantially circular in cross section, and in which said inner ends of said groove at said locations adjacent said passageway have the contour of circular segments.

* * * * *